United States Patent [19]

Oshima et al.

[11] 4,268,127

[45] May 19, 1981

[54] LIGHT TRANSMITTING AND REFLECTING POLARIZER

[75] Inventors: Nobuo Oshima; Sajiro Maeda, both of Ibaraki, Japan

[73] Assignee: Nitto Electric Industrial Co., Ltd., Ibaraki, Japan

[21] Appl. No.: 31,798

[22] Filed: Apr. 20, 1979

[30] Foreign Application Priority Data

Sep. 29, 1978 [JP] Japan .................................. 53-120664
Jan. 31, 1979 [JP] Japan .................................. 54-10795

[51] Int. Cl.³ .............................................. G02F 1/13
[52] U.S. Cl. .............................. 350/337; 350/339 D; 350/398
[58] Field of Search ................. 350/337, 339 D, 345, 350/155, 188; 428/363, 402, 403

[56] References Cited

U.S. PATENT DOCUMENTS 3,984,176 10/1976 Hirai et al. .................... 350/345 X
4,025,688 5/1977 Nagy et al. .................... 350/337 X
4,042,294 8/1977 Billings et al. ................... 350/345

OTHER PUBLICATIONS

Arellano: "Multiplexed Twisted Nematic Liquid Crystal Display with Wide-view Angle", *IBM Technical Disclosure Bulletin*, vol. 20, Apr. 1978, pp. 4930–4931.

*Primary Examiner*—Edward S. Bauer
*Attorney, Agent, or Firm*—Sughrue, Rothwell, Mion, Zinn and Macpeak

[57] ABSTRACT

A new and useful light transmitting and reflecting polarizer is disclosed comprising a transparent or semi-transparent resin film, an adhesive layer having uniformly dispersed therein transparent and/or semi-transparent particles, and a polarizing layer. This polarizer is useful in liquid crystal display devices.

24 Claims, 4 Drawing Figures

LIGHT TRANSMITTING AND REFLECTING POLARIZER

BACKGROUND OF THE INVENTION

1. Field of the Invention

This invention relates to a new and useful light transmitting and reflecting polarizer for use in liquid crystal display devices, which reflects and polarizes incident light, and diffuses and transmits light from a luminous body. More specifically, the present invention relates to a light transmitting and reflecting polarizer comprising a transparent or semi-transparent resin film, an adhesive layer having uniformly dispersed therein transparent and/or semi-transparent particles, and a polarizing layer, said layers being bonded to each other in this order.

2. Description of the Prior Art

Light transmitting and reflecting polarizers (simply referred to as polarizers herein) are used in liquid crystal display devices such as liquid crystal display devices for digital watches, electronic computers, and various meters and gauges.

Liquid crystal display devices are roughly classified into: (i) a type comprising a photoconducting member made of a material having high transparency, such as an acrylic resin plate having fine raised and depressed portions provided on the surface, a reflecting plate provided on the back surface of the photoconducting member, and a lamp provided to the side; and (ii) a type in which a reflecting material having the ability to permit light transmission is used instead of the photoconducting member and a luminous body comprising a fluorescent material and a radioactive material such as tritium (such that radiation generated in the radioactive material collides with the fluorescent material and emits light) is provided beneath the reflecting material. The polarizer of the present invention is used mainly in liquid crystal display devices of the latter type.

A known reflecting material having light transmitting ability is made by forming fine depressions and projections on the surface of a transparent synthetic resin film by treatments such as sanding or horning, and vacuum-depositing a metal film on the roughened surface of the resin film. However, when the amount of the metal deposited is limited in order to obtain sufficient light transmittance, the resulting film has inferior reflectance. On the other hand, as the amount of the metal deposited is increased, the light transmittance of the resulting metallized film decreases and becomes poor. Thus, it has been desired to overcome this difficulty.

SUMMARY OF THE INVENTION

It is therefore an object of this invention to provide a polarizer capable of uniformly polarizing incident light by refraction and reflection.

It is another object of this invention to provide a polarizer which occupies only a small space within a liquid crystal display device and is light in weight and easy to produce.

A characteristic feature of the present invention is that uniform polarizing ability is imparted to a polarizing layer by a transparent or semi-transparent resin film having light transmitting or light diffusing and transmitting ability and an adhesive layer containing transparent and/or semi-transparent particles and having light diffusing and transmitting ability.

Another characteristic of this invention is that a transparent or semi-transparent resin film having light transmitting or light transmitting and diffusing ability is bonded to a polarizing layer through an adhesive layer to form a unitary structure.

Various investigations concerning light transmitting and reflecting polarizers having sufficient ability to reflect incident visible light, and to conduct light from a luminous body uniformly to the surface of a liquid crystal cell while refracting and reflecting it have been made. These investigations led to the discovery that a novel polarizer having sufficient reflecting ability and exhibiting uniform photoconducting phenomenon can be obtained by bonding a transparent or semi-transparent resin film, an adhesive layer containing transparent and/or semi-transparent particles, and a polarizing layer in this order.

DETAILED DESCRIPTION OF THE INVENTION

Figure 1:
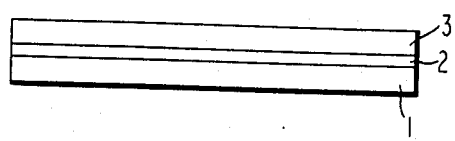
FIGS. 1 and 3 are side views of the polarizer of the present invention.

The term "light transmittance", as used in the present application, denotes the strength of parallel light rays from a tungsten lamp incident a light-receiving surface (20 mm in diameter) of a sample. The strength of the light rays in the absence of the sample is taken as 100%.

Resin films which are used in this invention are roughly classified into transparent films, and films having light diffusing and transmitting ability. Generally the resin films used in the present invention have a transmittance of at least about 60% transmittance, preferably at least about 70% transmittance. The latter films are subdivided into films having light diffusing ability at their surfaces (surface-type films) and films having light diffusing ability at their interior (interior-type films). Resin films having the dual function of surface and internal diffusing ability can also be used.

Examples of the transparent resin films are transparent films having a thickness of about 10 to 500 $\mu$ obtained by shaping synthetic resins having optical transparency such as (meth)acrylic, meth(acrylate), polyacetate, polycarbonate, polyester, and polyurethane resins.

Examples of surface-type films are semi-transparent film-like materials prepared by treating the aforesaid transparent films by sanding, horning, etc. to provide on one or both surfaces thereof depressions and projections in which the distance between adjacent projections is about 0.1 to 50 $\mu$, preferably about 1 to 10 $\mu$, the perpendicular depth from the top of a projection to the bottom of a depression is about 0.1 to 10 $\mu$, preferably about 0.5 to 3 $\mu$, and the number of the depressions or projections respectively is about 1,000 to 100,000 /mm². This film-like material is generally about 10 to 500 $\mu$ thick, preferably 20 to 50 $\mu$ thick, and transmits at least 40% of the light emitted from the luminous body.

An example of an internal type film is a semi-transparent film having a thickness of about 10 to 500 $\mu$ obtained by uniformly dispersing a light-diffusing material in a optically transparent synthetic resin as exemplified above, and shaping the mixture into a film. Examples of light diffusing materials include a metal oxide such as aluminum oxide or titanium oxide, a metal powder such as an aluminum powder, a tin powder, a gold powder or a silver powder, a rare earth oxide or an alkaline earth metal oxide, etc. The amount of the light-diffusing material mixed into the synthetic resin varies for example, depending upon its particle diameter (about 0.01 to 30 $\mu$, preferably about 0.5 to 5 $\mu$), shape and reflecting ability. A preferred amount is about 0.3 to about 30% by weight since this amount provides a resin film having the dual function of light diffusion and light transmission and having a light transmittance of at least 10%. By forming minute projections and depressions on one or both surfaces of the resin film containing a light diffusing material to impart diffusing property to both its interior and surface, the resin film provides more uniform light diffusion and has a favorable polarizing efficiency.

Other examples of an internal type resin films which diffuse and transmit light by the internal structure of the resin article are foamed semi-transparent films having a thickness of about 0.03 to 1.0 mm, preferably 0.05 to 0.2 mm, and a light transmittance of at least 10%, preferably about 40 to 80%, which is prepared by drawing an optically transparent synthetic resin as exemplified above (e.g., polystyrene) at an expansion ratio of about 1.5 to 10 in a customary manner, and then subjecting it to a treatment such as heating-pressing and/or heating-stretching, to thereby attain an internal structure in which flat cells having a diameter of about 0.3 to 2 mm are assembled. In addition a semi-transparent film-like material having a thickness of about 0.03 to 1.5 mm, preferably 0.05 to 0.5 mm, and a light transmittance of at least 10%, preferably about 60 to 80%, which is composed of a fibrous article having numerous minute voids among the fibers, such as paper obtained by sheet-forming of natural and/or synthetic resin fibers or a non-woven fabric composed of interwoven fibrous yarns can be used.

Selection of the type of resin depends on the purpose of the polarizer. Transparent films are economical. With surface-type films a lamp is illuminated more uniformly and internal-type films are particularly useful when a lamp is directly adhered thereto.

The resin article described above is bonded to the polarizing layer via an adhesive layer containing transparent and/or semi-transparent particles to be described below, thus forming the polarizer of this invention.

The adhesive layer used in this invention is a film prepared from an adhesive material having substantial optical transparency (i.e., at least 60% transmittance, preferably at least 80% transmittance) and transparent and/or semi-transparent particles, which can firmly bond the resin article layer and the polarizing layer. The adhesive material can be made up of, for example, a solvent-base adhesive agent of an epoxy, polyester or vinyl acetate resin, a pressure-sensitive adhesive of an alkyl acrylate or polyvinyl ether resin, or an adhesive resin curable by polymerization, such as an acrylic resin or an urethane resin. The adhesive contains uniformly dispersed therein about 3 to about 60% by weight, preferably 10 to 50% by weight, more preferably 20 to 40% by weight, of transparent and/or semi-transparent particles, and has a light transmittance of at least 10% and preferably about 30 to 60%.

The transparent or semi-transparent particles uniformly reflect and diffuse incident light sufficiently, and polarize the light which has passed through the resin layer from the luminous body, by refraction and reflection.

The adhesive thin film can be formed by coating the adhesive layer composition on the resin particle layer and/or the polarizing layer and drying. The pressure-sensitive adhesive film may be pre-formed on a release sheet, and bonded to the resin film, etc.

The transparent and/or semi-transparent particles used in the adhesive layer have a refractive index of at least 1.5, preferably at least about 2.0. The particles generally have a transmittance of at least about 30%, preferably at least about 50%. Their particle diameter varies according to the shape of the particles. If the particles are circular, granular or bead-like, their particle diameter is preferably about 0.1 to about 50 $\mu$, most preferably about 1 to 30 $\mu$. If they have a shape having directionality, e.g., their length is larger than their thickness, for example, they are scale-like, needle-like or dendritic shape, their particle size is preferably about 1 to about 180 $\mu$, most preferably about 3 to 80 $\mu$. Suitable transparent and/or semi-transparent particles include scale-like mica, titanium oxide-coated mica, plate-like or fish scale-like foils (natural pearl essence), hexagonal plate-like basic lead carbonate, bismuth oxide chloride, and pearl pigments. Glass products such as minute glass beads and pulverized glass particles, and plastic products such as plastic chips or pulverized plastic particles having properly selected refractive indices can also be used.

Titanium dioxide-coated mica is preferred as the transparent and/or semi-transparent particles. It is prepared by cleaving and pulverizing muscovite to form scale-like muscovite flakes having an average particle diameter of about 3 to about 150$\mu$ and a thickness not more than about 1/10, preferably 1/15 to 1/100, of the diameter, coating a fine powder of titanium dioxide having a particle diameter of about 0.03 to about 0.08$\mu$ on the surface, and burning the coating to form a thin titanium coating. The use of the titanium dioxide-coated mica is very practical because the mica flakes align in the thin adhesive layer to form a laminar structure, and the incident light is diffused as a result of regular multiple reflections by the aligned scale-like transparent and/or semi-transparent mica particles, and thus, the resulting ahdesive layer has a light transmittance of about 10 to about 60%.

Since the adhesive layer containing such transparent and/or semi-transparent particles has the function of diffusing and transmitting light itself, it can be applied to the transparent-type resin film and exhibit its function. In this case, the resin film is used primarily to impart self-supporting property to the polarizer. The adhesive layer is used to bond the transparent or semi-transparent resin article layer to the polarizing layer.

The polarizing layers used in the present invention are of a conventional construction. Examples of suitable polarizing layers include a polarizer prepared by absorbing iodine or a dichromatic dye into a film such as a polyvinyl alcohol film or polyvinyl butyral film and aligning it; and a polarizer prepared by forming a protective coating, by bonding or by coating and curing, on one or both surfaces of a polyene-type polarizer obtained by dechlorinating a polyvinyl chloride film or dehydrating a polyvinyl alcohol film. Colored polarizing layers can also be used in this invention. The colored polarizing layers are obtained when the protective coating is a colored film obtained by adding a coloring agent such as dyestuff to a transparent material such as acrylic resins, methacrylic resins, polycarbonate resins, acetates, polyester resins or polyurethane resins followed by film-forming the mixture or by forming a transparent film from the transparent material and then adsorbing the coloring material onto the film. Typical examples of polarizers are described, for example, in U.S. Pat. Nos. 2,454,515, 2,173,304, 2,306,108 and 2,255,940, and West German Patent No. 1,015,236. These polarizers can be used in this invention. A suitable polarizer has properties such as a transmittance of about 48% at a degree of polarization of at least about 80% and a transmittance of about 43% at a degree of polarization of at least 90%. However, these properties are only provided as illustrative and are not intended to limit the scope of this invention. Regarding colored polarizing layers, where the colored polarizing layers are prepared such that an average transmittance (A) in a visible light region of 420 to 570 nm is 63% or less, an average transmittance (B) in a visible light region of 570 to 700 nm is 70% or less and the difference [(B) - (A)] is 7% or more, a suitable gold-colored polarizing layer can be obtained.

The present invention is now explained in more detail by reference to the accompanying drawings.

Figure 2:
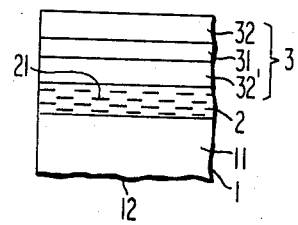
FIGS. 2 and 4 are enlargements of a portion of FIGS. 1 and 3.

FIG. 1 illustrates an example of this invention, and FIG. 2 is an enlarged view of a portion of FIG. 1. In FIGS. 1 and 2, a semi-transparent resin layer 1 composed of a polyester film 11 and minute raised and depressed portions 12 formed on the light receiving surface of the polyester film is bonded to polarizing layer 3 via adhesive layer 2 having aligned in a layer transparent and/or semi-transparent titanium dioxide-coated mica 21. Polarizing layer 3 consists of a polarizer 31 composed of a polyvinyl alcohol film and a polarizer element adsorbed thereto and oriented and protective coatings 32 and 32' of triacetate film formed on both surfaces of the polyvinyl alcohol film.

Figure 3:
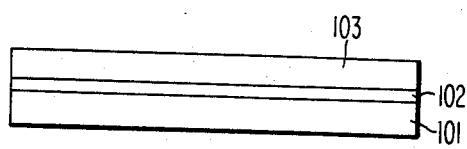
Figure 4:
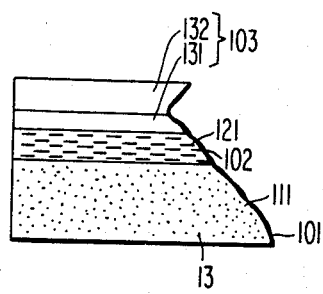

In FIGS. 3 and 4, semi-transparent resin layer 101 composed of a polyester film 111 and a light diffusing material 13 such as titanium oxide uniformly dispersed therein is bonded to polarizing layer 103 via adhesive layer 102 having titanium dioxide-coated mica 121 aligned therein. Polarizing layer 103 composed of a polarizer element 131 and a protective coating 132 formed on one surface of the polarizer element 131. No protective layer is formed on the other surface of the polarizing layer, and the layer 102 has the dual function of being an adhesive layer and of protecting the polarizing element 131.

As is clearly appreciated from the foregoing description, the light transmitting and reflecting polarizer of this invention diffuses and transmits light emitted from a luminous body and reflects the incident light. It occupies only a small space in liquid crystal display devices, and is light in weight and low in cost.

While the invention has been described in detail and with reference to specific embodiments thereof, it will be apparent to one skilled in the art that various changes and modifications can be made therein without departing from the spirit and scope thereof.

What is claimed is:

1. A light transmitting and reflecting polarizer comprising a transparent or semi-transparent resin film, an adhesive layer having uniformly dispersed therein transparent and/or semi-transparent particles, and a polarizing layer, said resin film and said polarizing layer being bonded through said adhesive layer.

2. The polarizer of claim 1, wherein said resin film is a transparent film having a thickness of about 10 to 500 microns.

3. The polarizer of claim 2, wherein said film is selected from the group consisting of an acrylate resin film, a (meth)acrylate film, an acetate resin film, a polycarbonate resin film, a polyester resin film and a polyurethane resin film.

4. The polarizer of claim 1, wherein said semi-transparent resin film is selected from the group consisting of (a) a semi-transparent film having surface light diffusing and transmitting ability, (b) a semi-transparent film having internal light diffusing and transmitting ability and (c) a semi-transparent film having surface and internal light diffusing and transmitting ability.

5. The polarizer of claim 4, wherein said semi-transparent film (a) has minute projections and depressions on at least one surface thereof and a light transmittance of at least about 40%.

6. The polarizer of claim 5, wherein the distance between said projections is about 0.1 to 50 microns, the perpendicular depth from the top of said projections to the bottom of said depressions is about 0.1 to 10 microns and the number of said projections or depressions is about 1,000 to 100,000/mm$^2$.

7. The polarizer of claim 4, wherein said semi-transparent film (b) has a thickness of about 10 to 500 microns and a light transmittance of at least about 10%.

8. The polarizer of claim 4, wherein said semi-transparent film (b) contains light diffusing materials.

9. The polarizer of claim 8, wherein the amount of said light diffusing material is about 0.3 to 30% by weight based on the weight of said film.

10. The polarizer of claim 8, wherein said light diffusing material have a particle diameter of about 0.01 to 30 microns.

11. The polarizer of claim 8, wherein said light diffusing materials are selected from the group consisting of metal powders, metal oxide powders, rare earth metal oxide powders and alkaline earth metal oxide powders.

12. The polarizer of claim 4, wherein said semi-transparent film (b) has an internal light diffusing structure.

13. The polarizer of claim 12, wherein said internal light diffusing structure is a structure comprising voids.

14. The polarizer of claim 13, wherein said semi-transparent film (b) having an internal structure comprising an assembly of voids has a thickness of about 0.03 to 1 mm and a light transmittance of at least about 10%.

15. The polarizer of claim 13, wherein said semi-transparent film (b) having an internal structure comprising fibers having voids therebetween has a thickness of about 0.03 to 1.5 mm and a light transmittance of at least about 10%.

16. The polarizer of claim 1, wherein said adhesive layer has a light transmittance of at least about 10%.

17. The polarizer of claim 1, wherein said transparent and/or semi-transparent particles have a refractive index of at least about 1.5 and have a particle diameter of about 0.1 to 180 microns.

18. The polarizer of claim 1, wherein the amount of said transparent and/or semi-transparent particles is about 3 to 60% by weight based on the weight of the adhesive layer.

19. The polarizer of claim 1, wherein said transparent and/or semi-transparent particles have a circular shape, a granular shape, a bead shape, a scale shape, a needle shape or a dendritic shape.

20. The polarizer of claim 1, wherein said transparent and/or semi-transparent particles are scale shaped particles.

21. The polarizer of claim 20, wherein said scale shaped particles have an average diameter of about 3 to 10 microns and a thickness of about 0.1 times or less the average diameter.

22. The polarizer of claim 1, wherein said transparent and/or semi-transparent particles are mica flake coated with a thin film of titanium dioxide.

23. The polarizer of claim 22, wherein said titanium dioxide has a particle diameter of about 0.03 to 0.08 micron.

24. In a liquid crystal display device the improvement which comprises: a transmitting and reflecting polarizer comprising a transparent or semi-transparent resin film, an adhesive layer having uniformly dispersed therein transparent and/or semi-transparent particles, and a polarizing layer, said resin film and said polarizing layer being bonded through said adhesive layer.

* * * * *